3,154,609
PRODUCTION OF CRIMPED FILAMENTS
Cipriano Cipriani, Hopewell, Va., assignor to Celanese Corporation of America, New York, N.Y., a corporation of Delaware
Filed Mar. 29, 1962, Ser. No. 183,364
11 Claims. (Cl. 264—168)

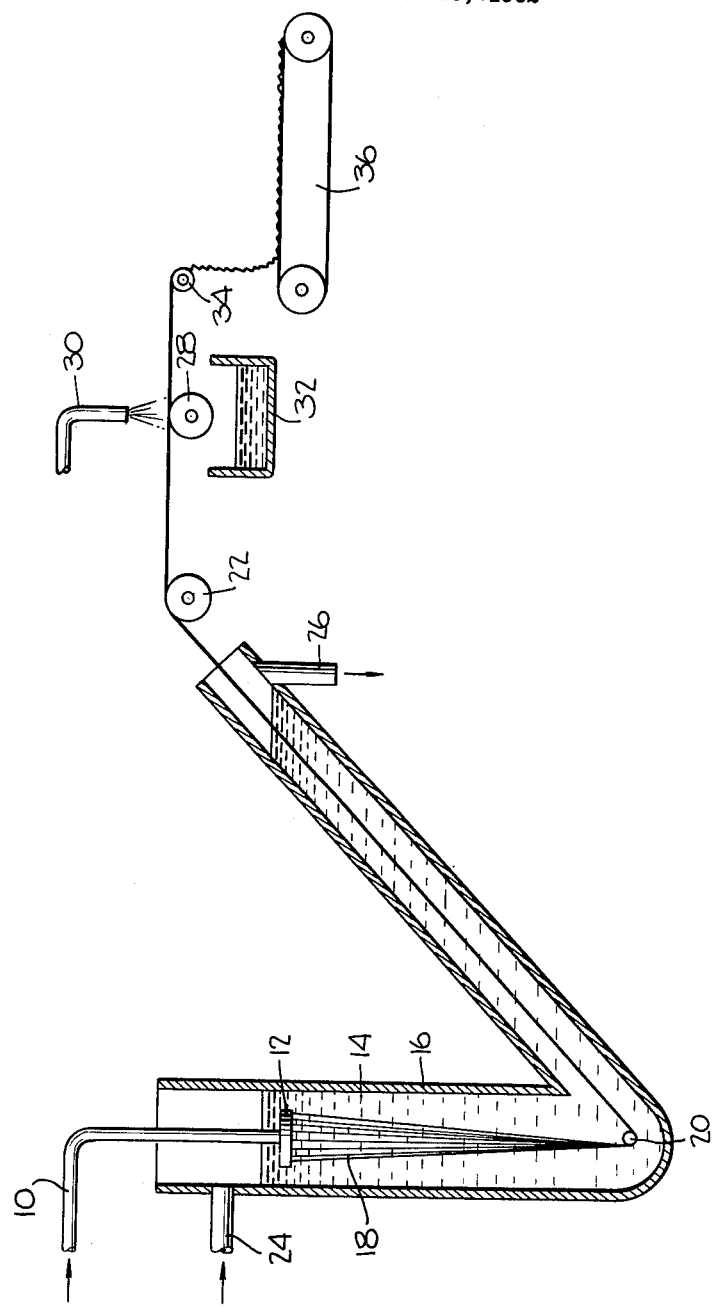

This invention relates to the production of crimped filamentary material.

There has been proposed in applicant's application Serial No. 83,981 filed January 23, 1961, the entire disclosure of which is incorporated herein by reference, a method for the formation of shaped articles of condensation polymers containing repeating =NCO— groups, utilizing a solution of the polymer in concentrated sulfuric acid. Although filaments produced by this method as such are satisfactory in many applications, there exist other applications for which the employment of crimped filaments is desirable, e.g. the manufacture of staple yarn. While it is possible to inject a crimp into filaments by mechanical means, e.g., through the use of gear or stuffing box crimpers, such mechanical crimping often causes some damage to the filaments and/or adversely affects their properties, e.g. mechanical properties such as tenacity and elongation. Moreover, mechanical crimping requires special equipment. Thus any method by which these filaments may be crimped without resorting to mechanical crimping means is highly desirable.

It is an object of this invention to provide an improved process for the production of crimped filamentary material. It is a further object of this invention to provide a process for the production of crimped filamentary material of a condensation polymer containing repeating =NCO— groups as an integral part of the polymer chain wherein the use of mechanical crimping means is avoided. Other objects will be apparent from the following detailed description and claims.

The drawing shows a schematic diagram of one embodiment of a process included within the scope of the invention.

In accordance with one aspect of the invention, a solution in concentrated sulfuric acid of a condensation polymer containing repeating amide groups, e.g., =NCO— group as an integral part of the polymer chain where R is hydrogen or a monovalent organic radical such as lower alkyl, is extruded into a suitable liquid coagulant to form filaments which are stretched before drying and subsequently dried while at least partially relaxed. This results in the formation of a spiral, tridimensional crimp in the filaments which is satisfactory for many applications for which the employment of crimped filaments is necessary or desirable.

The condensation polymers to which the process of this invention may be applied are, for example, the polyamides proper, e.g. the nylons, wherein the =NCO— groups is attached to a carbon atom on the carbonyl side, the polyurethanes which contain repeating =NCOO— groups, and the polyureas which contain repeating =NCON= groups. While the process may be beneficially carried out on solutions of polymers such as polyhexamethylene adipamide and polycaprolactam, it is particularly suitable for the production of crimped filaments of the "difficultly meltable" polymers, i.e., the polymers which cannot easily be shaped using melt extrusion techniques because they tend to seriously degrade and/or further polymerize to a useless infusible mass when heated to a temperature sufficient to melt them. These polymers include, for example, high melting polymers, e.g. polyamides proper melting above 275° C. and in general polymers having cyclic groups, e.g., meta- or paraphenylene, cycloalkylene groups such as 1,4-cyclohexylene and/or heterocyclic groups such as piperazylene or an alkyl substituted piperazylene group e.g. 2-lower alkyl piperazylene such as 2-methyl piperazylene or 2,5-di-lower alkyl piperazylene such as 2,5-dimethyl piperazylene, as an integral part of the polymer chain.

Some contemplated polyamides are those, for example, which have repeating structural units of the formula —NR—Y—NR'—CO—Y'—CO— which result from the condensation of a dicarboxylic acid or a derivative thereof e.g., a salt, acyl halide, or ester of such an acid, with a diamine, wherein the R's which may be the same or different, are hydrogen or monovalent organic radicals e.g. lower alkyl such as methyl or ethyl, and the Y's, which also may be the same or different, are divalent organic radicals such as alkylene e.g., ethylene, tetramethylene or hexamethylene, arylene such as para- or metaphenylene, para- or meta- xylylene, or para- and metadiethylene benzene, cycloalkylene such as 1,4-cyclohexylene and divalent heterocyclic radicals such as those derived from piperazine, or alkyl and di-alkyl piperazines, e.g. 2-methyl- and 2,5-dimethyl piperazines and 2-ethyl and 2,5-diethyl piperazines, wherein the open bonds are attached to the nitrogen atoms, and wherein the chemical structure of the polymer and/or the polymerization technique used in such that a relatively high melting polymer is obtained.

An important group of polyamides within the above group are those in which Y and/or Y' is or contains a para- or metaphenylene radical or a 1,4-cyclohexylene radical, and particularly important are condensation products of a diamine and terephthalic acid or a derivative of terephthalic acid e.g. terephthaloyl chloride or a dialkyl terephthalate. Some specific polymers within this latter group are poly (polymethylene) terephthalamides wherein the polymethylene groups contain 2 to 10 carbon atoms, e.g. poly-hexamethylene terephthalamide, polyocetamethylene terephthalamide, polytetramethylene terephthalamide, polyethylene terephthalamide, and polypiperazylene terephthalamide. Other polyterephthalamides are poly-o-, m-, and p-phenylene terephthalamides, and poly-o-, m, and p-diethylene-phenylene terephthalamides, the latter produced, for example, by condensing an ester-forming derivative of terephthalic acid with para-bis (betaaminoethyl) benzene. The polyterephthalamides when shaped in accordance with the invention exhibit a particularly good combination of properties, e.g. mechanical properties such as tenacity and elongation, water insensitivity as indicated by high wet stiffness and low shrinkage, and high sensitivity to disperse and acid dyes.

Also contemplated are high melting autocondensation polymers, e.g. melting above 275° C., of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl-4-aminocyclohexane or its lactam, 1-carboxy-4-aminocyclohexane or its lactam and 1-carboxymethyl-3-aminocyclopentane or its lactam.

The polyurethanes contemplated are polymers having repeating structural units of the formulas

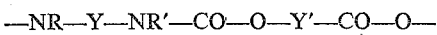

—NR—Y—NR'—CO—O—Y'—CO—O— resulting for example, from the condensation of a diisocyanate with a dihydric alcohol or phenol or the condensation of a diamine with a bis (chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly preferred are polyurethanes prepared from dihydric alcohols or phenols containing a meta- or para-phenylene or a 1,4-cyclohexylene radical. Some specific polyurethanes which may be used are the condensation product of piperazine with the bis (chloroformate) of bis (p-hydroxyphenyl) propane-2,2, the condensation product of piperazine with the bis (chloroformate) of hydroquinone and the condensation product of tetramethylene diamine with the bis (chloroformate) of butanediol-1,4 each of which has a melting point above 210° C.

The contemplated polyureas have repeating structural units of the formula

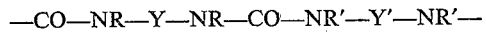

wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha/beta diurea with a diamine, the chemical structure of the polymer and/or the polymerization technique being such that a polymer melting above 179° C., preferably above 210° C. is obtained. Some specific polyureas contemplated are those obtained from the reaction of hexamethylene diisocyanate with hexamethylene diamine and from the reaction of m-phenylene diisocyanate with m-phenylene diamine, each of which polyurea melts above 210° C.

The solutions which are wet spun in accordance with this invention are formed by dissolving the polymer in sulfuric acid of 75 to 100%, preferably 95 to 100% by weight. Fuming sulfuric acid, e.g. containing up to 6 or 7% by weight or even higher of free sulfur trioxide, may also be used. A suitable concentration of the polymer in the spinning solution is, for example, in the range of 5 to 30% by weight.

A particularly suitable liquid coagulant is an aqueous solution of sulfuric acid having a concentration considerably lower than that of the acid in which the polymer is dissolved and low enough such that the polymer is coagulated into a shaped article. When using aqueous sulfuric acid as the liquid coagulant, the concentration of sulfuric acid in said liquid coagulant, i.e. the spin bath may be varied considerably depending on various modifications of the process. However, such concentration, especially when spinning polyterephthalamides such as polyhexamethylene terephthalamide, will in many cases be below 60% by weight, and, in some cases may be as low as 40%. Moreover, concentrations lower than 40% may be used in some cases. The temperature of the spin bath into which the spinning solution is extruded may be, for example, in the range of 20 to 100° C., preferably 40 to 60° C. Filaments, e.g. of polyterephthalamides such as polyhexamethylene terephthalamide, of particularly desirable properties are obtained using a substantially unmodified spinning system of the foregoing type if the aqueous sulfuric acid of the spin bath has a temperature and concentration within the areas defined by curves A and B of FIGURE 1 of application Serial No. 83,981. However, it is possible in some cases to alter somewhat the shapes and locations of these curves and the other curves of the figure by using various process modifications.

The polymer solutions of this invention may also be wet spun into coagulating or spin baths other than aqueous sulfuric acid. For example at temperatures around 20° C. the sulfuric acid solutions of this invention, e.g. of polyhexamethylene terephthalamide may be extruded into aqueous formic acid of 52 to 68% by weight formic acid concentration or into aqueous acetic acid of 52 to 63% by weight concentration. The solutions may also be extruded into spin baths of aqueous formic or acetic acid of considerably higher temperature e.g. 35 to 55° C. in which case lower acid concentrations may be used.

The spinning solutions of this invention may be spun at a spinning speed, e.g. at the first takeup roll, of for example, 10 to 150 meters per minute to obtain filaments having a denier in the range, for example of 0.1 to 50.

The stretching of the undried filaments may be carried out in the spin bath or after removing the filaments from the spin bath. One important method of stretching the filaments is by "snubbing," i.e. pulling the filaments around an obstacle such as a deflecting rod, pin, idler or positively driven roll or other kind of guide. Alternatively, the wet filaments may be taken up by a first godet roll and subsequently by a second roll traveling at a speed greater than that of the first roll. In stretching the filaments after they have left the spin bath by the use of rolls running at differential speeds, it may be desirable to carry out the stretching in a bath of hot water, aqueous sulfuric acid of about 50% by weight concentration at about 50° C. or some other swelling liquid. In this way, the filaments may be maintained in a desired state of plasticity for drawing to realize a maximum improvement in fiber properties.

The stretching operation is carried out such that the resulting increase in length of the filament beyond the snubbing guide and/or between two rolls is in the range, for example of 10 to 200, preferably 25 to 150%.

In accordance with another aspect of the invention, the process is carried out by extruding the polymer solution in a generally downward direction and stretching the resulting filaments in accordance with the process of the invention by pulling them around an obstacle, e.g. a deflecting rod, pin, idler or positively driven roll or other kind of guide. The filaments are pulled through the spin bath in an upslanting direction and taken up, for example, by positively driven rolls outside the spin bath. In addition to the specific methods dislosed in application Serial No. 83,981, this type of process may be accomplished for example by extruding the spinning solution downwardly through the orifices of a spinneret located near the end of the inlet leg of a V-shaped spinning tube. The inlet leg may be vertical or inclined, and the yarn may be pulled around a snubbing guide located in the vertex of the spinning tube and then upward through the outlet leg of the spinning tube. The vertical dimension of the spinning tube may be varied within wide limits, e.g. 50 to 550 centimeters and the vertex angle of tube may also vary widely, e.g. 20 to 165°. If the vertex angle is significantly below 90°, the inlet leg will generally be vertical or inclined, while if the angle is close to 90° or above, the inlet leg will generally be inclined. The distance of the snubbing guide from the face of the spinneret may be varied within wide limits, e.g. from about 10 to about 500 centimeters. Preferably, this distance is from about 10 to 100 centimeters when the spinning speed, i.e., take-up speed of the yarn, is around 10 meters per minute, from about 50 to 200 centimeters when the spinning speed is around 50 meters per minute, and from about 100 to 400 centimeters when the spinning speed is around 150 meters per minute.

After being stretched and washed with water until acid free, the filaments are dried under substantially tensionless condition to develop a tridimensional crimp. The drying step may be carried out in various ways, e.g. by floating the substantially tensionless filaments in a stream of a warm gas such as air preferably at elevated temperatures, as by passing the filaments and gas through a tunnel or long chute, or by collecting a skein of the wet filaments on the surface of a porous belt or screen and subjecting the skein to the evaporative action of the warm gas. The yarn may be dried in the form of continuous filaments or tow or wet material may be cut into staple lengths and then dried. In the case of a continuous filament yarn or tow, the material may also be dried on a heated tapered advancing reel or set of tapered skewed or canted steam heated rolls. The taper allows shrinkage to occur during drying. The temperature of the gas or heated surface used in the drying step may be for example in the range of 50 to 175° C. and the amount of normally liquid material remaining in the filament after drying is usually no higher than about 6% based on the weight of the dry filament.

In accordance with still another aspect of the invention, the filaments which are stretched as described above are subjected in the relaxed state and while saturated with a swelling liquid such as water to contact with an inert fluid, i.e., a gas or liquid, at an elevated temperature e.g. 60 to 180° C. for a period of 2 to 15 minutes, and preferably in the case of poylhexamethylene terephthalamide at a temperature of 70 to 100° C. for a period of 1 to 10 minutes. This treatment may be carried out on the wet stretched filaments in which case the crimp is developed on subsequent drying, or on filaments which are crimped as a result of having been dried while allowing for relaxation of the filament. The treatment has the effect of improving the mechanical properties, e.g. the tensile factor of the crimped filaments and also of setting and increasing the number of crimps if it is carried out on already crimped filaments. While the heat treatment may be carried out by means of any inert fluid medium, e.g. steam and hot air, the preferred fluid medium for the heat treatment of the crimped filaments is a liquid and is preferably hot water, e.g. at 100° C.

The process is further illustrated in the drawing wherein spinning solution enters the system through conduit 10, is extruded through spinnerette 12 in the downward direction into spin bath 14 located in spinning tube 16. The resulting filaments 18 are pulled in a vertical downward direction around snubbing pin 20 located at the vertex of spinning tube 16 and thence in an upslanting direction to takeup roll 22 located right outside spinning tube 16. The yarn is taken up by takeup roll 22 at a rate such that considerable stretching takes place in the upslanting leg of the spinning tube 16. Coagulant is introduced into spinning tube 16 through inlet 24 and withdrawn through outlet 26 so that the coagulant travels cocurrent with the filaments. The yarn then passes to one or more wash rolls 28 where it is washed with water ejected from conduit 30, the spent wash water falling into trough 32. The yarn then passes to guide 34 which places it upon apron drier 36 fitted with a perforated apron and a source of heated air (not shown). The yarn which is thus dried in a relaxed state forms a tridimensional crimp and is then passed to a receptacle for crimped continuous filament yarn or cut into staple in a conventional manner.

The following example further illustrates the invention.

*Example I*

Polyhexamethylene terephthalamide having an inherent viscosity of 1.10 measured as a solution of 0.4 gram of polymer or deciliter of concentrated sulfuric acid solvent at 25° C. was dissolved with stirring for 2 hours at 50° C. in concentrated sulfuric acid of 98% by weight concentration to yield a solution containing 18% by weight of polymer based on the weight of acid, and having a Synchro-Lectric viscosity of 3265 poises at 25° C. The solution was filtered and extruded in a horizontal direction through a jet 100 microns in diameter into a spin bath of aqueous sulfuric acid of 49.8% weight $H_2SO_4$ concentration maintained at a temperature of 47.5° C. The spin bath was contained in an open trough one meter long and was circulated cocurrent with the direction of extrusion at a velocity between 0.1 and 2 meters per minute. The filament was stretched by being snubbed in an upward direction around a guide located in the spin bath near its exit end such that the filament defined an angle of 135° around the guide and was pulled around another guide located outside the exit end of the spin bath so as to resume its horizontal direction. After being stretched about 31% on the outlet side of the snubbing guide, the filament was taken up on a perforated bobbin rotating at a peripheral speed of 50 meters per minute, washed until acid free, cut into 20-inch lengths and dried overnight while hanging free in air at 25° C. It thereupon developed a tridimensional crimp with about 8 to 10 crimps per inch.

The crimped filamentary material had a denier per filament of 2.55, a tenacity of 2.97 grams per denier, an elongation of 67.1% and a tensile factor of 24.3.

The crimped material was boiled in water at 100° C. for 10 minutes in a relaxed state after which it had about 10 to 12 crimps per inch, a denier per filament of 2.55, a tenacity of 3.26 grams per denier, an elongation of 63.4% and a tensile factor of 26.3. Moreover, the crimp was permanently set in the filaments which were now crystalline as shown by X-ray analysis whereas they had been amorphous prior to boiling in water.

When the procedure of the above example was repeated except that the yarn was dried at constant length or was not snubbed before being cut into staple, no crimp developed in the filaments.

*Example II*

Polyhexamethylene terephthalamide having an inherent viscosity of 1.32 measured as described in Example I and ammonium sulfate were dissolved in concentrated sulfuric acid of 99% by weight $H_2SO_4$ concentration to yield a solution containing 15.8% by weight of polymer and 5% by weight of ammonium sulfate and having a viscosity of 2200 to 2500 poises at 25° C. The solution was filtered and extruded through a spinneret containing 100 holes each 100 microns in diameter and arranged concentrically in circles in a downward direction into the vertical inlet leg of a V-shaped spinning tube containing as circulating spin bath aqueous sulfuric acid of 47.2% by weight $H_2SO_4$ concentration at a temperature of 45° C. The vertical inlet leg of the spinning tube was 152 centimeters long, the vertex angle at the bottom of the tube was 45° and the length of the upslanting outlet leg was 215 centimeters. The formed filaments were snubbed around a pin located in the vertex of the spinning tube about 50 inches from the face of the spinneret located in the spinning tube near its inlet end. After being stretched about 30% beyond the snubbing guide, the filaments were taken up at a speed of 60 meters per minute by a take-up roll located outside the outlet end of the spinning tube, washed with water until substantially acid-free, and run through an apron drier while in the relaxed state. The dried yarn had a tridimensional crimp containing about 8 to 10 crimps per inch and had a denier per filament of 2.46, a tenacity of 2.87 grams per denier, an elongation of 44.1%, and a tensile factor of 19.1.

The yarn also developed a tridimensional crimp when skein dried at room temperature.

Filamentary material produced in accordance with this invention generally contains 5 or more, e.g. 5 to 15 crimps per inch having an amplitude in the range of about 0.5 to 2 mm. The percent crimp based on the straightened length is generally above about 10%, e.g. 20 to 60% where the percent crimp is defined as follows:

$$\frac{\text{Straightened length} - \text{crimped length}}{\text{Straightened length}} \times 100$$

The crimped filamentary material of this invention is particularly useful in the production of staple yarn for textile manufacture. In spinning staple yarn from the crimped material of this invention, the need for special compounds to develop frictional forces among the fibers is eliminated or substantially reduced.

The values of tenacity and elongation given above are averages of 80 determinations each as measured with an Instron Tensile Tester at a 3⅓ inch gauge length and a 60% per minute strain rate, in air at 23° C. and 65% relative humidity.

This application is a continuation-in-part of application Serial No. 83,981, filed January 23, 1961.

It is to be understood that the foregoing detailed description is given merely by way of illustration and that many variations may be made therein without departing from the spirit of my invention.

Having described my invention what I desire to secure by Letters Patent is:

1. In a process comprising extruding a solution in concentrated sulfuric acid of at least 75% by weight acid concentration, of a fiber forming condensation polymer containing repeating amide groups as an integral part of the polymer chain, through at least one opening into aqueous sulfuric acid of acid concentration low enough to cause coagulation of the polymer and thus form at least one filament of the polymer, the improvement comprising stretching said filament before drying in the range of 10 to 150% of the initial length of the filament, and drying said filament while it is at least partially relaxed whereby it develops a tridimensional crimp.

2. The process of claim 1 wherein said polymer is a difficultly meltable polyamide melting above 275° C.

3. The process of claim 2 wherein said polyamide is a polyterephthalamide.

4. The process of claim 3 wherein said polyterephthalamide is polyhexamethylene terephthalamide.

5. The process of claim 1 wherein said polymer is polyhexamethylene terephthalamide.

6. The process of claim 1 wherein said filament in the relaxed state is contacted with a hot inert fluid at a temperature of 60 to 180° C. for a period of 1 to 10 minutes.

7. The process of claim 6 wherein said fluid is boiling water.

8. The process of claim 1 wherein said filament is dried in the relaxed state.

9. The process of claim 1 wherein said filament is cut into staple length segments prior to drying.

10. The process of claim 1 wherein the solution is extruded in a downward direction and the filament is pulled around an obstacle and stretched in the spin bath in an upslanting direction before being withdrawn from the spin bath.

11. In a process comprising extruding a solution in concentrated sulfuric acid of at least 75% by weight acid concentration, of a fiber forming polyhexamethylene terephthalamide, through at least one opening into aqueous sulfuric acid of acid concentration low enough to cause coagulation of the polymer and thus form at least one filament of the polymer, the improvement comprising washing said filament with water until acid-free, stretching said filament before drying in the range of 10 to 150% of the initial length of the filament, and drying said filament while it is at least patrially relaxed whereby it develops a tridimensional crimp.

References Cited in the file of this patent

UNITED STATES PATENTS

| | | |
|---|---|---|
| 2,130,948 | Carothers | Sept. 20, 1938 |
| 2,249,756 | Finzel | July 22, 1941 |
| 2,287,099 | Hardy et al. | June 23, 1942 |
| 2,296,202 | Hardy | Sept. 15, 1942 |
| 2,489,569 | Foulds et al. | Nov. 29, 1949 |
| 2,517,694 | Merion et al. | Aug. 8, 1950 |
| 2,715,763 | Marley | Aug. 23, 1955 |
| 2,811,410 | Munch et al. | Oct. 29, 1957 |
| 2,918,347 | Notarbartolo et al. | Dec. 22, 1959 |
| 3,040,003 | Beaman | June 19, 1962 |